(12) United States Patent
Noh et al.

(10) Patent No.: US 8,300,301 B2
(45) Date of Patent: Oct. 30, 2012

(54) METHOD OF MANUFACTURING SUBSTRATE AND DISPLAY APPARATUS HAVING THE SAME

(75) Inventors: Jung-Hun Noh, Yong-si (KR); DaeJin Park, Incheon (KR); SonUk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 185 days.

(21) Appl. No.: 12/816,807

(22) Filed: Jun. 16, 2010

(65) Prior Publication Data
US 2011/0176197 A1   Jul. 21, 2011

(30) Foreign Application Priority Data
Jan. 19, 2010   (KR) .................. 10-2010-0004852

(51) Int. Cl.
G02B 26/00 (2006.01)
G09G 3/34 (2006.01)
(52) U.S. Cl. ...................... 359/296; 345/107
(58) Field of Classification Search .......... 359/296, 359/265–275; 345/87, 105, 107; 349/158, 349/1, 56, 71; 430/32, 34, 38; 204/450, 204/600
See application file for complete search history.

(56) References Cited

U.S. PATENT DOCUMENTS

| 6,888,587 B2 * | 5/2005 | Deane .................. 349/44 |
| 7,339,177 B2 * | 3/2008 | Bijlsma et al. ........... 250/370.11 |
| 2008/0117378 A1 * | 5/2008 | Son et al. .............. 349/155 |

FOREIGN PATENT DOCUMENTS

| JP | 2009-185282 | 8/2009 |
| KR | 1020070109630 A | 11/2007 |
| KR | 1020080016888 | 2/2008 |

* cited by examiner

Primary Examiner — Tuyen Tra
(74) Attorney, Agent, or Firm — Cantor Colburn LLP

(57) ABSTRACT

A method of manufacturing a substrate includes; disposing a preliminary planarization layer on a first surface of a plastic substrate, bonding a second surface of the plastic substrate onto a carrier substrate, wherein the second surface of the plastic surface is substantially opposite to the first surface, curing the preliminary planarization layer to form a planarization layer, and separating the carrier substrate from the plastic substrate.

19 Claims, 7 Drawing Sheets

METHOD OF MANUFACTURING SUBSTRATE AND DISPLAY APPARATUS HAVING THE SAME

This application claims priority to Korean Patent Application No. 2010-4852, filed on Jan. 19, 2010, and all the benefits accruing therefrom under 35 U.S.C. §119, the content of which in its entirety is herein incorporated by reference.

BACKGROUND OF THE INVENTION

1. Field of the Invention

The present invention relates to a method of manufacturing a substrate and a display apparatus having the substrate. More particularly, the present invention relates to a method of manufacturing a substrate having an improved flatness and a display apparatus having the substrate.

2. Description of the Related Art

Among the various types of flat panel displays, a plastic display is capable of being flexibly bent. The plastic display typically includes a plastic substrate and a pixel arranged on the plastic substrate having a film shape. This is in contrast to an arrangement wherein a pixel is arranged on a glass substrate that is hard and inflexible.

However, when a foreign substance is introduced on a surface of the plastic substrate, the foreign substance is easily stuck onto the plastic substrate due to characteristics of the plastic material for the plastic substrate, such as a compressibility of the plastic substrate. Thus, a flatness of the plastic substrate is deteriorated, and it is difficult to form thin films required to form the pixel on the plastic substrate.

BRIEF SUMMARY OF THE INVENTION

Embodiments of the present invention provide a method of manufacturing a substrate having an improved flatness.

Embodiments of the present invention provide a display apparatus having the substrate.

According to the exemplary embodiments, a method of manufacturing a substrate is provided as follows. A preliminary planarization layer is disposed on a first surface of the plastic substrate. Then, a second surface of the plastic substrate is bonded onto a carrier substrate wherein the second surface of the plastic substrate is substantially opposite the first surface. The preliminary planarization layer is cured to form a planarization layer, and the carrier substrate is separated from the plastic substrate.

In one exemplary embodiment, the method further includes disposing an adhesive layer on the second surface of the plastic substrate prior to bonding the second surface of the plastic substrate on the carrier substrate.

According to the exemplary embodiments, a display apparatus includes; a first substrate including a pixel, the first substrate including; a first base substrate, and a first planarization layer including a single layer with a thickness of about 10 micrometers to about 50 micrometers arranged between the first base substrate and the pixel, wherein the first planarization layer planarizes a surface of the first base substrate, and a second substrate facing the first substrate.

According to the above, a time interval required to form the planarization layer for improving a flatness of the substrate may be reduced. More particularly, in a configuration wherein a spin coating process is used to form the planarization layer on the substrate, a thickness of a thin film obtained by a single stage of a spin coating process may be thinner than a desired thickness for the planarization layer, and thus, multiple stages of spin coating processes are required to obtain the desired thickness for the planarization layer. Consequently, the time interval required to form the planarization layer having the desired thickness increases. In addition, although the multiple stages of spin coating processes may be performed to form the planarization layer, additional curing processes for the thin film obtained after each spin coating process is used, thereby increasing the time interval required to form the planarization layer. However, according to the present invention, the planarization layer having the desired thickness is formed with a single stage of a rolling process, thereby reducing the time interval required to form the planarization layer on the substrate.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE INVENTION

Figure 1:
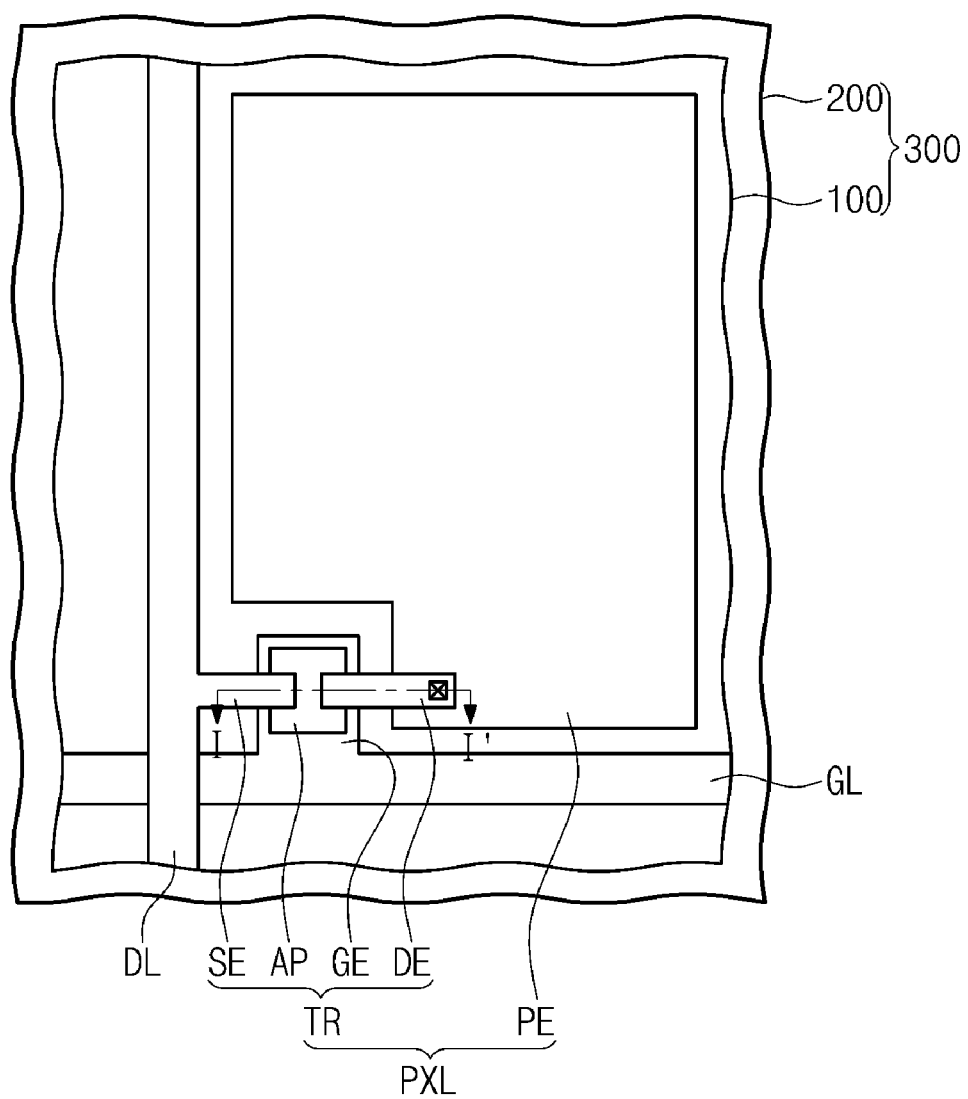
FIG. 1 is a top plan view showing a portion of an exemplary embodiment of a display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the present invention will be explained in detail with reference to the accompanying drawings.

Figure 2A:
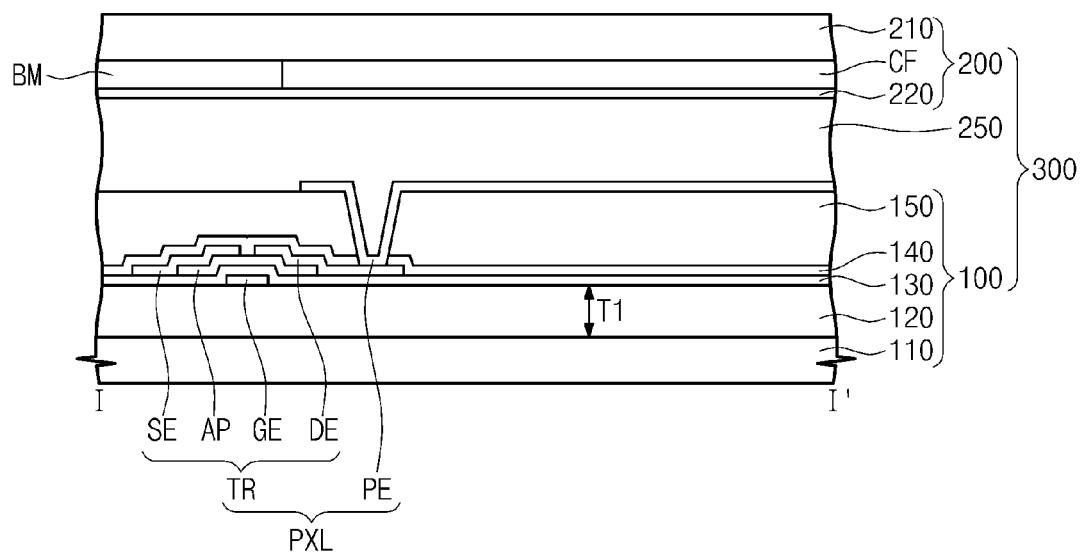
FIG. 2A is a cross-sectional view taken along line I-I' of FIG. 1.
Figure 2B:
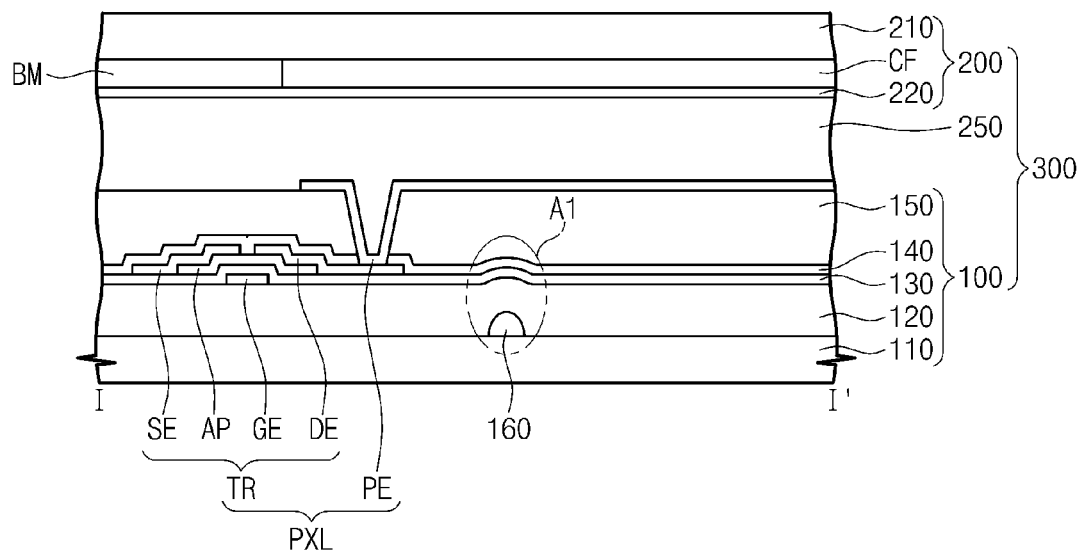
FIG. 2B is a cross-sectional view showing an exemplary embodiment of a display apparatus in which a foreign substance is introduced on a first base substrate of FIG. 2A.

FIG. 1 is a top plan view showing a portion of an exemplary embodiment of a display apparatus according to the present invention, FIG. 2A is a cross-sectional view taken along line I-I' of FIG. 1, and FIG. 2B is a cross-sectional view showing an exemplary embodiment of a display apparatus in which a foreign substance is introduced on a first base substrate of FIG. 2A. In the present exemplary embodiment, a first substrate 100 includes a plurality of pixels. However, since the pixels have substantially the same structure and function, one pixel PXL will be described in detail in FIG. 1, and thus detailed descriptions of other pixels will be omitted.

Referring to FIGS. 1 and 2A, a display apparatus 300 may be a liquid crystal display ("LCD"), and thus, the display apparatus 300 includes a first substrate 100, a second substrate 200 and a liquid crystal layer 250 disposed between the first substrate 100 and the second substrate 200.

The first substrate 100 includes a first base substrate 110, a first planarization layer 120, and the pixel PXL.

In the present exemplary embodiment, the first base substrate 110 may be a substrate including plastic, such as polyimide or other materials with similar characteristics. Therefore, the first base substrate 110 may have properties such as flexibility as compared with a rigid substrate including materials such as glass or quartz.

The first planarization layer 120 is arranged on the first base substrate 110. In the present exemplary embodiment, the first planarization layer 120 may have a single-layered structure, and the first planarization layer 120 has a first thickness T1 of about 10 micrometers to about 50 micrometers. Alternative exemplary embodiments include configurations wherein the first planarization layer 120 may have a multiple-layered structure (not shown).

In addition, in the present exemplary embodiment, the first planarization layer 120 may include a resin that is curable by heat, e.g., a heat-cured resin. For example, the first planarization layer 120 may be formed by heat curing a material including at least one of an acrylate-based resin, an epoxy-based resin, an amine-based oligomer or other materials with similar characteristics.

Also, in an exemplary embodiment wherein the first planarization layer 120 absorbs a light, the first planarization layer 120 may further include carbon particles, black pigment or other materials embedded therein. More detailed descriptions of embodiments wherein the first planarization layer 120 absorbs light will be described with reference to FIG. 5.

The pixel PXL includes a gate line GL, a data line DL, a thin film transistor TR and a pixel electrode PE and the pixel PXL is arranged on the first planarization layer 120.

The gate line GL applies a gate signal to the thin film transistor TR, and the data line DL applies a data signal to the thin film transistor TR. In a cross-sectional view, as shown in FIGS. 2A and 2B, an insulating layer 130 is arranged between the gate line GL and the data line DL to electrically insulate the gate line GL and the data line DL from each other.

In the present exemplary embodiment, the thin film transistor TR includes a gate electrode GE branched from the gate line GL, a semiconductor pattern AP arranged on the gate electrode GE, a source electrode SE extending from the data line DL and arranged on the semiconductor pattern AP, and a drain electrode DE spaced apart from the source electrode SE and arranged on the semiconductor pattern AP. The thin film transistor TR may be turned on upon receiving the gate signal through the gate line GL and the gate electrode GE.

An inter-insulating layer 140 is arranged on the thin film transistor TR to cover the thin film transistor TR, and an organic insulating layer 150 is arranged on the inter-insulating layer 140. In addition, the inter-insulating layer 140 and the organic insulating layer 150 are partially removed at an area corresponding to the thin film transistor to expose a portion of the drain electrode DE, and the pixel electrode PE is arranged on the organic insulating layer 150 to cover the exposed portion of the drain electrode DE. The exposed portion of the drain electrode DE is defined by partially removing the inter-insulating layer 140 and the organic insulating layer 150. Therefore, the pixel electrode PE may be electrically connected to the exposed portion of the drain electrode DE, and when the thin film transistor TR is turned on, the data signal may applied to the pixel electrode PE through the source electrode SE, the semiconductor pattern AP, and the drain electrode DE.

In the present exemplary embodiment, the second substrate 200 includes a second base substrate 210, a color filter CF, a black matrix BM, and an opposite electrode 220. Although, alternative exemplary embodiments may include configurations wherein the color filter CF may be disposed on the first substrate 100 (not shown).

In the present exemplary embodiment, the second base substrate 210 may be a plastic substrate, similar to the first base substrate 110. Thus, the second base substrate 210 may also be flexible.

The black matrix BM is arranged on the second base substrate 210 and does not overlap with the pixel electrode PE from a top plan view. The black matrix BM blocks light from transmitting through the liquid crystal layer 250 and exiting to an exterior of the display apparatus 300. In the present exemplary embodiment, the color filter CF is arranged on the second base substrate 210 to filter light that is transmitted through the liquid crystal layer 250 to have a predetermined color. The opposite electrode 220 is arranged on the black matrix BM and the color filter CF to form an electric field together with the pixel electrode PE to control orientation directions of liquid crystal molecules included in the liquid crystal layer 250.

In the present exemplary embodiment, the color filter CF is arranged on the second base substrate 210, however, as mentioned briefly above, the color filter CF may be arranged on the first base substrate 110. Also, the opposite electrode 220 may be arranged on the first base substrate 110 while being spaced apart from the pixel electrode PE. In such an alternative exemplary embodiment wherein the opposite electrode 220 is arranged on the first base substrate 110, the opposite electrode 220 may form a horizontal electric field with the pixel electrode PE to control the orientation direction of the liquid crystal molecules.

Referring to FIGS. 1 and 2B, a foreign substance 160 may be introduced on the first base substrate 110. During a manufacturing procedure of the first substrate 100, the first base substrate 110 is exposed to an exterior, and thus the foreign substance 160 may be introduced on the first base substrate 110, e.g., the foreign substance 160 may be accidentally introduced from the external environment surrounding the first substrate 100 during manufacturing. Also, the foreign substance 160 may be formed when particles such as silicon dioxide, which are provided inside the first base substrate 110 to prevent an electrostatic charge from being generated on a surface of the first base substrate 110, are protruded from the surface of the first base substrate 110.

In the present exemplary embodiment, wherein the first base substrate 110 is a plastic substrate, the foreign substance 160 formed on the first base substrate 110 is stuck onto the first base substrate 110, so that it is difficult to remove the foreign substance 160 from the first substrate as compared to a configuration wherein the foreign substance is located on a glass substrate. The foreign substance 160 causes a step difference on the surface of the first base substrate 110, and thus, if nothing is done to prevent such an occurrence, thin films above the foreign substance 160 may be disconnected when the thin films arranged on the first base substrate 110 are patterned. However, in the present exemplary embodiment the first planarization layer 120 covers the foreign substance 160 to planarize the surface of the first base substrate 110, thereby preventing the disconnection of the thin films.

Figure 3:
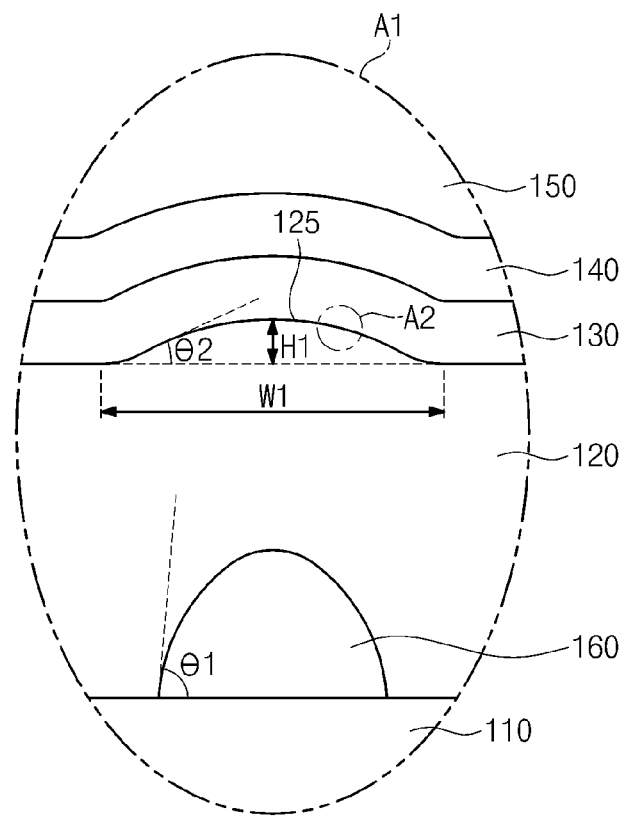
FIG. 3 is a partially enlarged view showing a first area of FIG. 2B.
Figure 4:
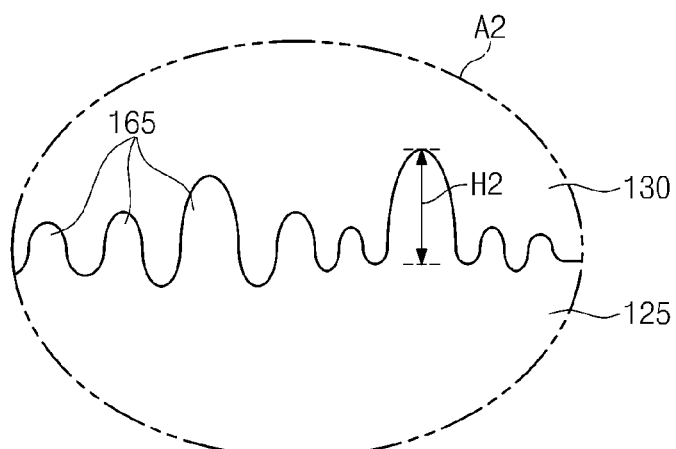
FIG. 4 is a partially enlarged view showing a second area of FIG. 3.

FIG. 3 is a partially enlarged view showing a first area A1 of FIG. 2B, and FIG. 4 is a partially enlarged view showing a second area A2 of FIG. 3.

Referring to FIGS. 3 and 4, the first planarization layer 120 planarizes the surface of the first base substrate 110 on which the foreign substance 160 is introduced, but the first planarization layer 120 may have a first protruding portion 125 protruded from a surface thereof corresponding to a position at which the foreign substance 160 is positioned, although the height of the first protruding portion 125 may be significantly less than a height of the foreign substance 160. In addition, the first protruding portion 125 may have a plurality of second protruding portions 165 that is protruded from a surface of the first protruding portion 125. As shown in FIG. 4, each of the second protruding portions 165 may have different shapes from each other, and thus the second protruding portions 165 may be different in height and weight from one another as will be described in more detail below.

Meanwhile, assuming that a maximum slope between the surface of the first base substrate 110 and a surface of the foreign substance 160 is defined as a first angle θ1 and a maximum slope between a non-protruding surface of the first planarization layer 120 and the surface of the first protruding portion 125 is defined as a second angle θ2, the first angle θ1 may be smaller than the second angle θ2 due to the planarization of the first planarization layer 120. That is, the first planarization layer 120 may improve the flatness of the first base substrate 110.

In the present exemplary embodiment, in an exemplary embodiment wherein the first planarization layer 120 has the first thickness T1 (shown in FIG. 2A) of about 10 micrometers to about 50 micrometers and the foreign substance 160 protruded from the first base substrate 110 has a height of about 2 micrometers to about 10 micrometers, the first protruding portion 125 has a first height H1 of about 1000 angstroms or less and a first width W1 of about 1.2 millimeters or less. Also, individual protruding portions of the second protruding portions 165 may have different second heights H2. In such an exemplary embodiment, a maximum height of the second heights H2 is about 80 nanometers or less, and an average height of the second heights H2 is of about 5 nanometers or less.

Figure 5:
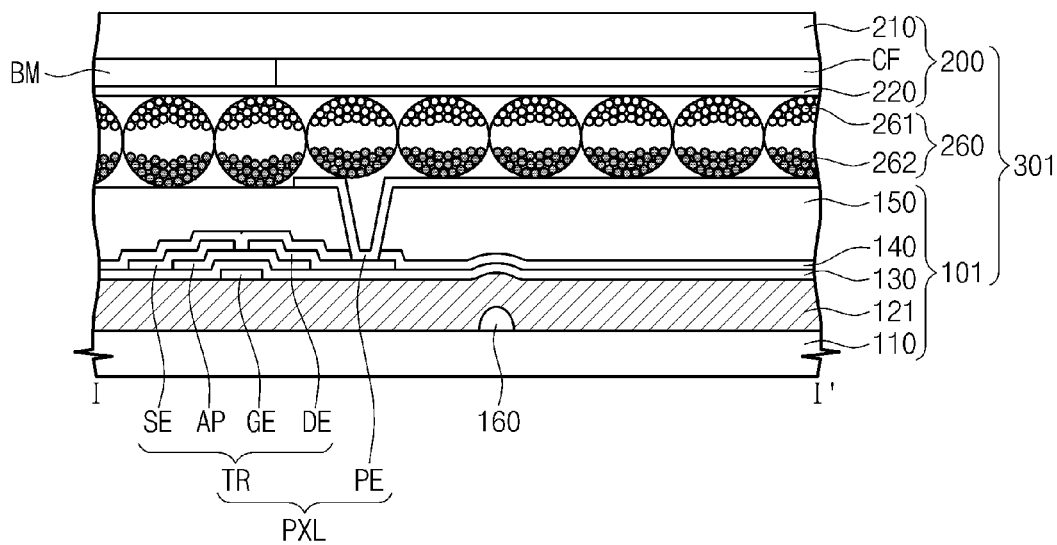
FIG. 5 is a cross-sectional view showing another exemplary embodiment of a display apparatus according to the present invention.

FIG. 5 is a cross-sectional view showing another exemplary embodiment of a display apparatus according to the present invention. In FIG. 5, the same reference numerals denote the same elements in FIGS. 1 to 4, and thus the detailed descriptions of the same elements will be omitted.

A display apparatus 301 shown in FIG. 5 displays an image in a reflective mode. The display apparatus 301 includes an electrophoretic layer, utilizing an electrophoresis effect, disposed between a first substrate 101 and a second substrate 200, and the electrophoretic layer includes a plurality of electrophoresis capsules 260.

According to FIG. 5, each of the electrophoresis capsules 260 includes black particles 262 and white particles 261, wherein the black particles 262 have a different polarity than the white particles 260. Therefore, when the electric field formed by the pixel electrode PE and the opposite electrode 220 is applied to the electrophoresis capsules 260, the black particles 262 are separated from the white particles 261 in the electrophoresis capsules 260 according to a polarity of the pixel electrode PE and the opposite electrode 220 that are applied with the electric field.

For example, in an exemplary embodiment wherein the black particles 262 are electrified with a negative polarity (−), the white particles 261 are electrified with a positive polarity (+), the pixel electrode PE has the positive polarity (+), and the opposite electrode 220 has the negative polarity (−), the black particles 262 move to the pixel electrode PE and the white particles 261 move to the opposite electrode 220 in the electrophoresis capsules 260. Thus, the light transmitted through the second substrate 200 and provided to the electrophoresis capsules 260 is reflected by the white particles 261, so that the display apparatus 301 may display the white color of the white particles 261. Alternatively, when the pixel electrode PE has the negative polarity (−), and the opposite electrode 220 has the positive polarity (+), the black particles 262 move to the opposite electrode 220 and the white particles 261 move to the pixel electrode PE in the electrophoresis capsules 260. Thus, the light transmitted through the second substrate 200 and provided to the electrophoresis capsules 260 is absorbed by the black particles 262, so that the display apparatus 301 may display the black color of the black particles 262.

In the present exemplary embodiment, when compared to the first planarization layer 120 shown in FIGS. 2A and 2B, a first planarization layer 121 may further include carbon particles or black pigment disposed therein to absorb the light. As a result, the first planarization layer 121 absorbs the light that is not reflected by the electrophoresis capsules 260 and is provided to the first substrate 101, thereby improving a display quality of the display apparatus 301.

Figure 6:
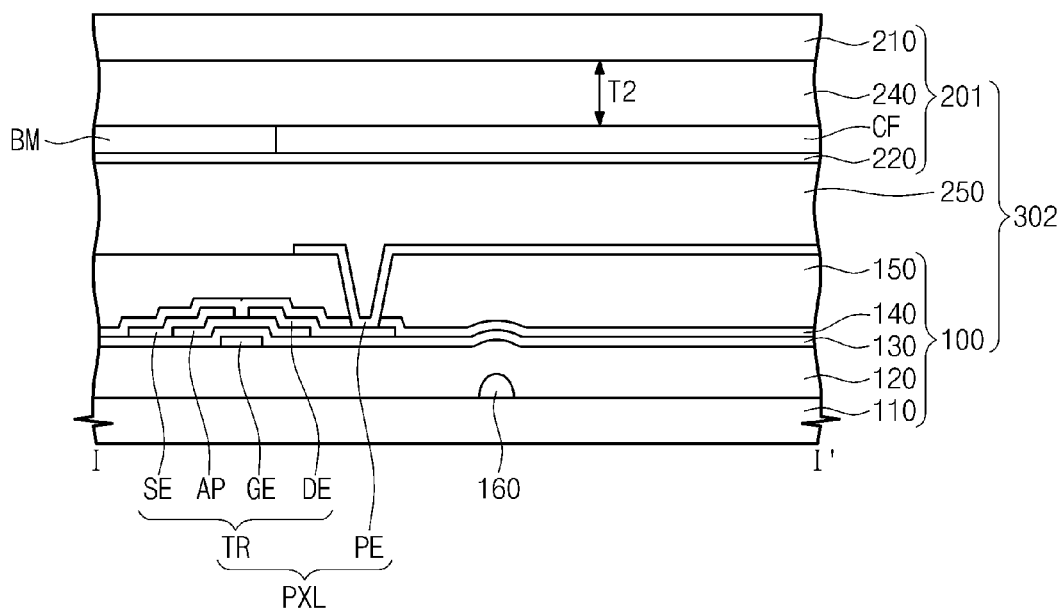
FIG. 6 is a cross-sectional view showing another exemplary embodiment of a display apparatus according to the present invention.

FIG. 6 is a cross-sectional view showing another exemplary embodiment of a display apparatus according to the present invention. In FIG. 6, the same reference numerals denote the same elements in FIGS. 1 to 4, and thus the detailed descriptions of the same elements will be omitted.

Referring to FIG. 6, a display apparatus 302 includes a first substrate 101, a second substrate 201, and a liquid crystal layer 250 disposed therebetween. The second substrate 201 further includes a second planarization layer 240 arranged between a second base substrate 210 and a color filter CF and between the second base substrate 210 and a black matrix BM.

According to the present exemplary embodiment as shown in FIG. 6, the second planarization layer 240 has a second thickness T2 of about 10 micrometers to about 50 micrometers, and the second planarization layer 240 may include substantially the same material as the first planarization layer 120.

As described above, the first planarization layer 120 described with reference to FIGS. 1, 2A, 2B, and 3 planarizes the first base substrate 110. Similarly, the second planarization layer 240 may cover a foreign substance (not shown) introduced on the second base substrate 210 to planarize the second base substrate 210 since the second planarization layer 240 is arranged on the second base substrate 210.

FIGS. 7 to 10 are side perspective views illustrating an exemplary embodiment of a method of manufacturing a first substrate of FIG. 2A. In FIGS. 7 to 10, the same reference numerals denote the same elements in FIGS. 1 to 4, and thus the detailed descriptions of the same elements will be omitted.

Figure 7:
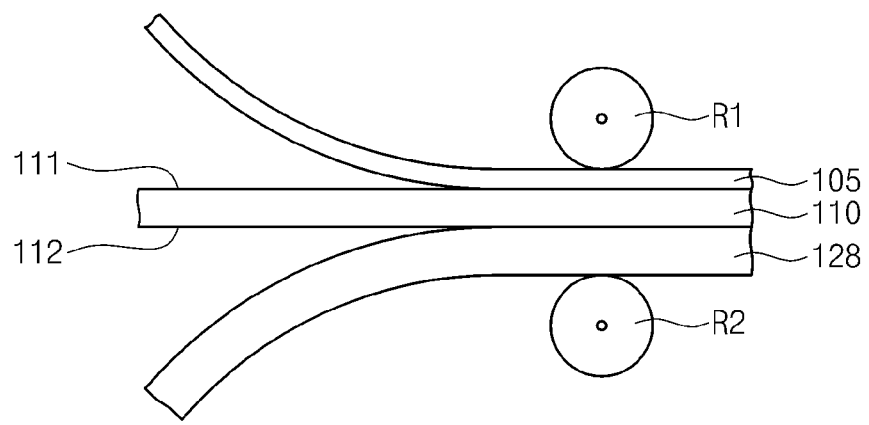
FIGS. 7 to 10 are side perspective views illustrating an exemplary embodiment of a method of manufacturing a first substrate of FIG. 2A.

Referring to FIG. 7, an adhesive layer 105 is formed on a first surface 111 of the first base substrate 110, and a preliminary planarization layer 128 is formed on a second surface 112 of the first base substrate 110, which is opposite to the first surface 111. More particularly, a first roller R1 is positioned on the first base substrate 110 and a second roller R2 is positioned under the first base substrate 110. Then, the adhesive layer 105 is pressed onto the first base substrate 110 by rolling the first roller R1 to form the adhesive layer 105 on the first surface 111 and the preliminary planarization layer 128 is pressed onto the first base substrate 110 by rolling the second roller R2 to form the preliminary planarization layer 128 on the second surface 112.

In the present exemplary embodiment, the first roller R1 and the second roller R2 may be substantially simultaneously operated, to thereby substantially simultaneously form the first adhesive layer 105 and the preliminary planarization layer 128 on the first base substrate 110. Therefore, a time interval required to form the adhesive layer 105 and the preliminary planarization layer 128 on the first base substrate 110 may be reduced. However, alternative exemplary embodiments include configurations wherein the first roller R1 and the second roller R2 may be operated at different times.

Also, in the present exemplary embodiment, the preliminary planarization layer 128 may be heated at a temperature of about 40° C., so that the preliminary planarization layer 128 may be adhered onto the first base substrate 110.

Meanwhile, in at least one alternative exemplary embodiment, the preliminary planarization layer 128 may be formed on the first base substrate 110 using a spin coating process. However, a thickness of a thin film obtained by a single stage of a spin coating process may be typically about 3 micrometers to about 4 micrometers. Thus, at least three or more spin coating processes may be used to form the preliminary planarization layer 128 having the thickness of about 10 micrometers to about 50 micrometers, so the time interval required to form the preliminary layer 128 increases. As described in the exemplary embodiment above, the preliminary planarization layer 128 is formed on the first base substrate 110 using the second roller R2, and thus the preliminary planarization layer 128 having the thickness of about 10 micrometers to about 50 micrometers may be formed on the first base substrate 110 with a single stage rolling process.

Figure 8:
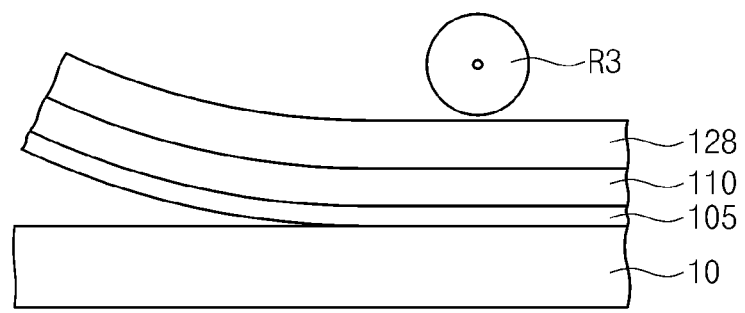

Referring to FIG. 8, when the adhesive layer 105 is bond to a carrier substrate 10, the first base substrate 110 and the preliminary planarization layer 128 are sequentially stacked on the carrier substrate 10 while interposing the adhesive layer 105 between the first base substrate 110 and the carrier substrate 10. In detail, a third roller R3 is positioned above the carrier substrate 10, and the adhesive layer 105, the first base substrate 110, and the preliminary planarization layer 128 which are coupled with each other are pressed by rolling the third roller R3.

In the present exemplary embodiment, the carrier substrate 10 is temporarily coupled with the first base substrate 110 in order to easily handle, e.g., transport, the first base substrate 110 having the flexibility during the fabrication of the first substrate 100. Thus, the carrier substrate 10 may be a substrate that is hard, such as a glass substrate, and the carrier substrate 10 is separated from the first substrate 100 after the first substrate 100 is completed.

Figure 9:
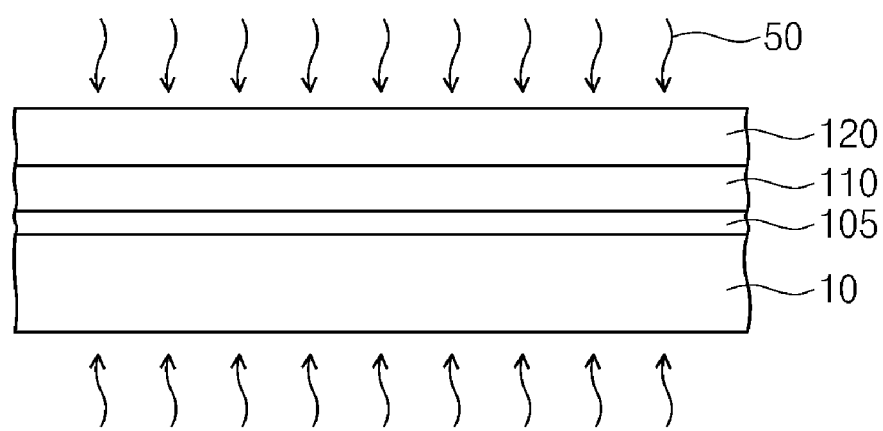

Referring to FIG. 9, the preliminary planarization layer 128 shown in FIG. 8 is cured through a heat treatment process to form the first planarization layer 120. Also, during the heat treatment process of the preliminary planarization layer 128, the adhesive layer 105 is cured to improve a bonding force between the carrier substrate 10 and the first base substrate 110. In the present exemplary embodiment, the heat treatment process is performed under a temperature of about 120° C. to about 250° C.

In addition, during the heat treatment process or after the completion of the heat treatment process, gas may be generated from, e.g., expelled from, the preliminary planarization layer 128. Thus, the first planarization layer 120 may have a weight that is smaller than the preliminary planarization layer 128 due to the gas expulsion. Particularly, the first planarization layer 120 may have a weight that is smaller by about 0.5% or less than the preliminary planarization layer 128 due to the heat treatment process.

As described above, the weight of the first planarization layer 120 is reduced by 0.5% or less than the preliminary planarization layer 128 due to the heat treatment process, and the first planarization layer 120 may be maintained at the thickness described with reference to FIG. 2A after the completion of the heat treatment process.

In addition, although the gas is generated while other layers are formed on the first planarization layer 120 that will be described in FIG. 10, the flatness of the first planarization layer 120 may be prevented from being deteriorated due to bubbles caused by the gas.

Figure 10:
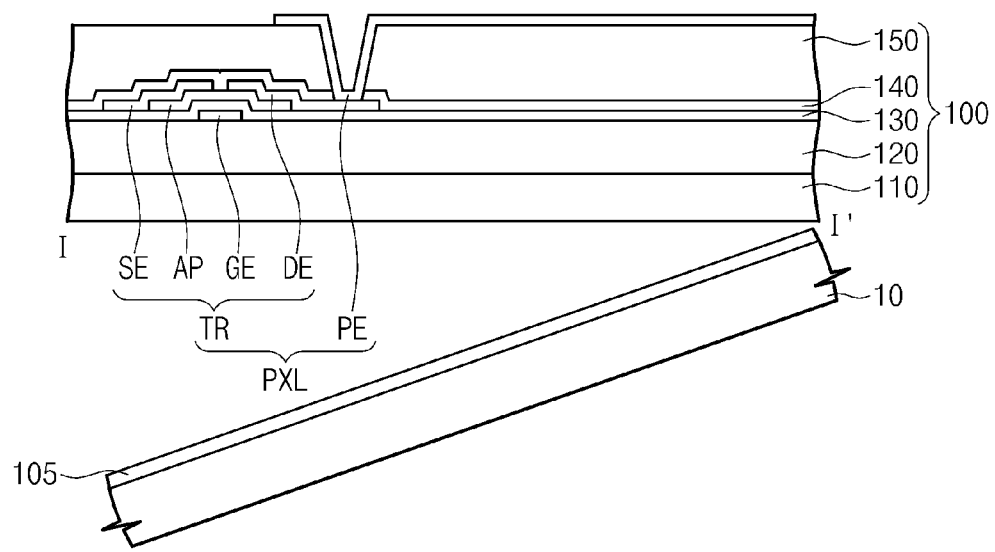

Referring to FIG. 10, as described with reference to FIGS. 1, 2A, and 2B, the gate line GL shown in FIG. 1, the data line DL shown in FIG. 1, and the pixel PXL shown in FIG. 2A are formed on the first planarization layer 120. Then, the adhesive layer 105 and the carrier substrate 10, which are arranged on a rear surface of the first base substrate 110, are separated from the first base substrate 110, thereby completing the first substrate 100.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a substrate, the method comprising:
    disposing a preliminary planarization layer on a first surface of a plastic substrate;
    bonding a second surface of the plastic substrate onto a carrier substrate, wherein the second surface of the plastic substrate is substantially opposite to the first surface;
    curing the preliminary planarization layer to form a planarization layer; and
    separating the carrier substrate from the plastic substrate,
    wherein the planarization layer comprises a first protruding portion disposed corresponding to a shape of a foreign substance and aligned with a position at which the foreign substance is covered when the foreign substance is located on the plastic substrate,
    wherein the first protruding portion has a height of about 1,000 angstroms or less and a width of about 1.2 millimeters or less, and
    wherein the first protruding portion comprises second protruding portions arranged on a surface of the first protruding portion, and the second protruding portions have a maximum height of about 80 nanometers measured from a flat surface of the planarization layer and have an average width of about 5 nanometers or less.

2. The method of claim 1, further comprising disposing an adhesive layer on the second surface of the plastic substrate prior to bonding the second surface of the plastic substrate on the carrier substrate.

3. The method of claim 2, wherein the adhesive layer and the preliminary planarization layer are disposed on the plastic substrate by pressing the adhesive layer and the preliminary planarization layer onto the plastic substrate using a first roller adjacent to the first surface and a second roller adjacent to the second surface, respectively.

4. The method of claim 3, wherein the adhesive layer and the preliminary planarization layer are substantially simultaneously disposed on the plastic substrate.

5. The method of claim 2, wherein the planarization layer is formed to have a thickness of about 10 micrometers to about 50 micrometers.

6. The method of claim 2, wherein the adhesive layer is cured with the preliminary planarization layer during curing of the preliminary planarization layer.

7. The method of claim 6, wherein the preliminary planarization layer and the adhesive layer are cured through a heat treatment process.

8. The method of claim 7, wherein the preliminary planarization layer further comprises a light absorbent material.

9. The method of claim 7, wherein the heat treatment process is performed at a temperature of about 120° C. to about 250° C., and the planarization layer has a weight which is about 0.5% or less smaller than a weight of the preliminary planarization layer after the heat treatment process.

10. The method of claim 1, wherein the preliminary planarization layer is selected from the group consisting of an acrylate-based polymer, an epoxy-based polymer, an amine-based oligomer and combinations thereof.

11. The method of claim 1, further comprising disposing a pixel on the planarization layer before separating the carrier substrate from the plastic substrate.

12. A display apparatus comprising:
    a first substrate including a pixel, the first substrate comprising:
    a first base substrate; and
    a first planarization layer including a single layer with a thickness of about 10 micrometers to about 50 micrometers arranged between the first base substrate and the pixel, wherein the first planarization layer planarizes a surface of the first base substrate; and
    a second substrate facing the first substrate,
    wherein the first planarization layer comprises a first protruding portion disposed corresponding to a shape of a foreign substance and aligned with a position at which the foreign substance is covered when the foreign substance is located on the first base substrate,
    wherein the first protruding portion has a height of about 1,000 angstroms or less and a width of about 1.2 millimeters or less, and
    wherein the first protruding portion comprises second protruding portions arranged on a surface of the first protruding portion, and the second protruding portions have a maximum height of about 80 nanometers measured from a flat surface of the first planarization layer and have an average width of about 5 nanometers or less.

13. The display apparatus of claim 12, wherein the first base substrate is a plastic substrate.

14. The display apparatus of claim 13, wherein the first planarization layer comprises a heat-cured resin.

15. The display apparatus of claim 14, wherein the first planarization layer is selected from the group consisting of an acrylate-based polymer, an epoxy-based polymer, an amine-based oligomer and combinations thereof.

16. The display apparatus of claim 15, wherein the first planarization layer further comprises a light absorbent material.

17. The display apparatus of claim 12, wherein the second substrate comprises:
   a second base substrate comprising a plastic material; and
   a second planarization layer including a single layer with a thickness of about 10 micrometers to about 50 micrometers, wherein the second planarization layer is arranged on the second base substrate and planarizes a surface of the second base substrate.

18. The display apparatus of claim 12, further comprising a liquid crystal molecule disposed between the first substrate and the second substrate.

19. The display apparatus of claim 12, further comprising an electrophoretic layer disposed between the first substrate and the second substrate.

* * * * *